Dec. 1, 1953   C. O. JORENBY   2,660,981
COMBINED FEED RECEPTACLE AND TROUGH
Filed April 28, 1950   2 Sheets-Sheet 1
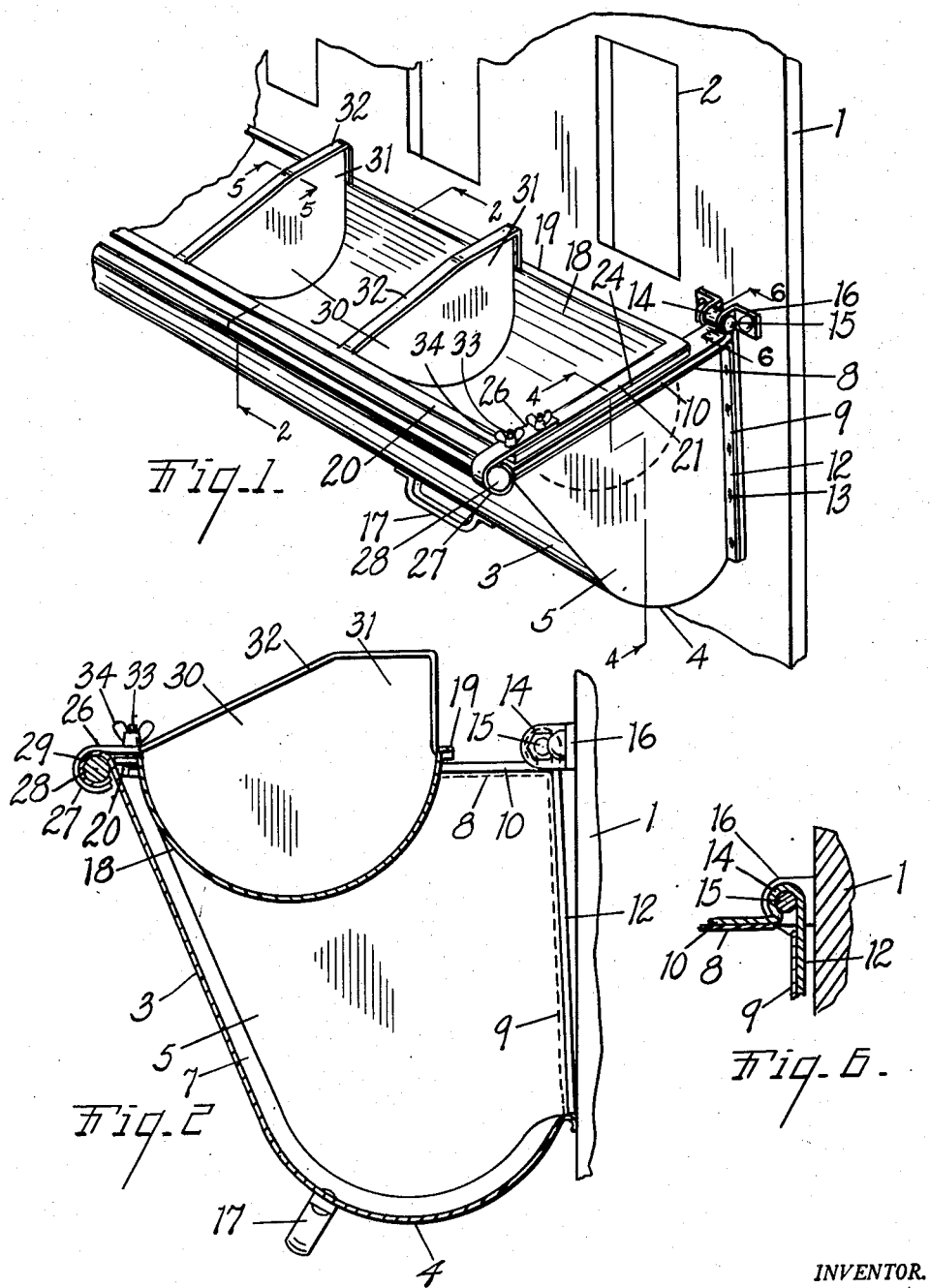
INVENTOR.
Carl O. Jorenby
BY
ATTORNEY.

Dec. 1, 1953   C. O. JORENBY   2,660,981
COMBINED FEED RECEPTACLE AND TROUGH
Filed April 28, 1950   2 Sheets-Sheet 2
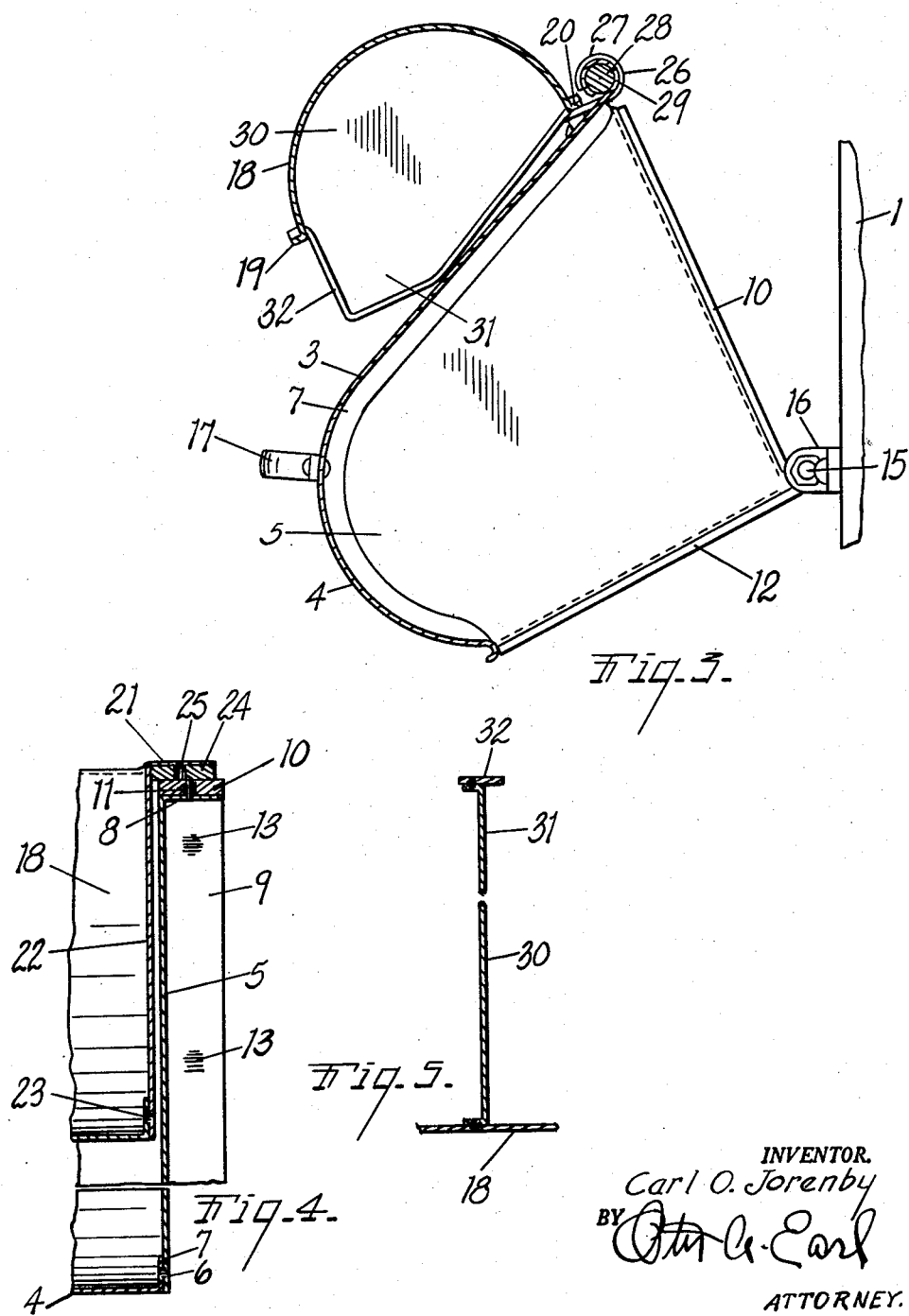
INVENTOR.
Carl O. Jorenby
BY
ATTORNEY.

Patented Dec. 1, 1953

2,660,981

UNITED STATES PATENT OFFICE 2,660,981

COMBINED FEED RECEPTACLE AND TROUGH

Carl O. Jorenby, Kennedy, N. Y.

Application April 28, 1950, Serial No. 158,861

4 Claims. (Cl. 119—61)

This invention relates to improvements in a combined feed receptacle and trough.

The main objects of this invention are:

First, to provide a combined feed receptacle and trough which is assembled as a unit for mounting on a support having spaced openings therein through which animals may have access to the receptacle and trough.

Second, to provide a combined receptacle and trough in which the trough is swingably supported on the receptacle and the receptacle is swingably supported to permit cleaning thereof and at the same time has a closed bottom permitting the feeding of chopped food or the like.

Third, to provide a structure having these advantages in which a plurality of animals such, for example, as calves may be fed and one animal is prevented from reaching into or robbing the trough of an adjacent animal.

Objects relating to details and economies of the invention will appear from the description to follow. The invention is pointed out in the claims.

A preferred embodiment of the invention is illustrated in the accompanying drawings, in which:

Fig. 1 is a fragmentary front perspective view of the combined receptacle and trough of my invention mounted upon a supporting wall.

Fig. 2 is an enlarged fragmentary vertical section on a line corresponding to line 2—2 of Fig. 1.

Fig. 3 is a fragmentary view corresponding to that of Fig. 2 illustrating the manipulation of the receptacle for cleaning.

Fig. 4 is an enlarged fragmentary view on a line corresponding to the broken line 4—4 of Fig. 1.

Fig. 5 is an enlarged fragmentary view in section on a line corresponding to line 5—5 of Fig. 1.

Fig. 6 is a fragmentary view on a line corresponding to line 6—6 of Fig. 1.

In the accompanying drawing, I represents a supporting wall having spaced openings 2 therein through which an animal at the rear of the wall may reach. The receptacle of my invention comprises a front wall 3 and a downwardly curved bottom 4 formed integrally therewith and merging into the front wall, the receptacle being formed of sheet metal. The end walls 5 of the receptacle are secured as by welding at 6 to the inturned flanges 7 on the front wall and bottom. The end walls have upturned flanges 8 and 9 on their upper and rear edges. The angled reinforcing and hanger members formed of integral strips are secured to these flanges, the forwardly projecting arms 10 being spot welded to the flanges 8 as indicated at 11 and the downwardly projecting arms 12 being spot welded to the flanges 9 as indicated at 13. The hanger members or strips are made into a loop to provide eyes 14 which receive the pivots 15 carried by the brackets 16 so that the receptacle is swingably mounted to be swung forwardly as indicated in Fig. 3 to facilitate cleaning. The receptacle is provided with a handle 17 to facilitate this manipulation. The receptacle is open at the rear thereof to permit discharge of refuse material from the bottom wall 4 when the receptacle is swung upwardly. The support I provides a rear wall for the receptacle when the receptacle is in a lowered position.

The feed trough 18 is of U-section and has outturned flanges 19 and 20 on its front and rear edges and outturned flanges 21 on its end walls 22. These end walls are spot welded to the inturned flanges 23 at the ends of the trough. Reinforcing bars 24 are secured as by spot welds 25 to the undersides of the flanges 21. Hinge members 26 are secured to the end flanges 21 and the reinforcing bars 24 and are provided with eyes 27 at their outer ends engaging the pivot rod 28. This pivot rod is secured to the upper edge of the front wall of the receptacle by wrapping the wall around it as is shown at 29 so that the pivot rod is effectively supported and further serves as a reinforcing member for the receptacle. Thus arranged the trough may be swung to a depending position in front of the receptacle and it is swingable with the receptacle as shown in Fig. 3. When in erected position the reinforcing bars of the trough rest upon the upper or forwardly projecting arms of the hangers whereby the trough is supported in the receptacle on the end walls thereof.

The trough is provided with partitions 30 located to provide trough sections in front of each opening 2. These partitions 30 have portions 31 which project upwardly above the rear edges of the trough and serve as guards preventing an animal reaching through one opening into an adjacent trough or a trough other than the one in front of the opening. The partitions are provided with reinforcing and guard strips 32 in their upper edges, the ends of these guard strips being secured to the front and rear flanges of the trough by any conventional means. They project laterally beyond the partitions and provide relatively sharp projecting edges which deter one animal from reaching over the partitions. However, the combined receptacle and trough should be mounted relative to the openings 2 so that an animal reaching through an opening is prevented from effectively feeding from an adjacent compartment as the upwardly projecting partition tends to choke the animal as it tries to reach down into the adjacent compartment. The attaching bolts 33 for the hinges 26 are provided with thumb nuts 34 to facilitate removal of the feed trough for cleaning if desired. It is only necessary to release one hinge to permit this.

I have illustrated and described my invention in a highly practical embodiment thereof. As stated, the structure is designed to be assembled as a unit on a support. In the drawing the support is indicated as a solid wall but it may, if desired, be otherwise formed, but in any event, it is provided with openings through which the animals may reach. Further, this enables the feeding of the animals from outside the enclosure. I have not attempted to illustrate various modifications and adaptations which I contemplate as it is believed that this disclosure will enable those skilled in the art to embody or adapt my invention as may be desired.

Having thus described my invention, what I claim as new and desire to secure by Letters Patent is:

1. A combined feed receptacle and feed trough adapted for mounting as a unit on a support provided with spaced openings through which animals may have access to the receptacle and trough, in combination, a receptacle comprising a front wall and a downwardly curved bottom formed integrally with and merging into the front wall, and end members secured to the ends of the front and bottom walls and having outwardly projecting top and rear flanges, angled reinforcing and hanger members secured to the said top and rear flanges of said end walls and having pivot eyes at the angles thereof, pivots adapted to be mounted on the support and coacting with the pivot eyes of said hanger members to support the receptacle to swing forwardly and upwardly, the support constituting the rear wall of the receptacle when the receptacle is in erected position, a combined wall reinforcing and pivot rod around which the upper edge of the front wall is wrapped, a trough of U-section having outturned flanges on its front and rear edges and provided with end walls having outturned flanges on their upper edges, reinforcing bars secured to the undersides of said flanges on said trough end walls, forwardly projecting hinge members secured to said reinforcing bars and swingably engaging said pivot rod, said trough being swingable on its hinges to a depending position at the front of the receptacle and swingable therewith or to erected position with its said reinforcing bars supported on the forwardly projecting arms of said receptacle hanger members, longitudinally spaced partitions for said troughs having rear portions projecting above the rear edge of the trough and constituting guards preventing animals reaching into a trough adjacent the one in front of an opening in the support, and reinforcing and guard strips secured on the upper edges of the partitions to project at each side thereof and secured at their ends to the flanges on the front and rear edges of the trough.

2. A combined feed receptacle and feed trough adapted for mounting as a unit on a support provided with spaced openings through which animals may have access to the receptacle and trough, in combination, a receptacle comprising a front wall and a downwardly curved bottom formed integrally with and merging into the front wall, and end members secured to the ends of the front and bottom walls and having outwardly projecting top and rear flanges, angled reinforcing and hanger members secured to the said top and rear flanges of said end walls and having pivot eyes at the angles thereof, pivots adapted to be mounted on the support and coacting with the pivot eyes of said hanger members to support the receptacle to swing forwardly and upwardly, the support constituting the rear wall of the receptacle when the receptacle is in erected position, a combined wall reinforcing and pivot rod around which the upper edge of the front wall is wrapped, a trough of U-section provided with end walls having outturned flanges on their upper edges, reinforcing bars secured to the undersides of said flanges on said trough end walls, forwardly projecting hinge members secured to said reinforcing bars and swingably engaging said pivot rod, said trough being swingable on its hinges to a depending position at the front of the receptacle and swingable therewith or to erected position with its said reinforcing bars supported on the forwardly projecting arms of said receptacle hanger members, and longitudinally spaced partitions for said troughs having rear portions projecting above the rear edge of the trough and constituting guards preventing animals reaching into a trough adjacent the one in front of an opening in the support.

3. A combined feed receptacle and feed trough adapted for mounting as a unit on a support provided with spaced openings through which animals may have access to the receptacle and trough, in combination a receptacle comprising a front wall and a bottom, and end members secured to the ends of the front and bottom and having outwardly projecting top and rear flanges, hanger members secured to the said top and rear flanges of said end walls, pivots for said hangers adapted to be mounted on the support to support the receptacle to swing forwardly and upwardly, a pivot rod on the upper edge of the front wall, a trough of U-section having outturned flanges on its front and rear edges and provided with end walls having flanges on their upper edges, reinforcing bars secured to said flanges on said trough and walls, forwardly projecting hinge members secured to said trough and swingably engaging said pivot rod, said trough being swingable on its hinges to a depending position at the front of the rack and swingable therewith or to erected position within the rack, longitudinally spaced partitions for said trough having portions projecting above the trough and constituting guards preventing animals reaching into a trough adjacent the one in front of an opening in the support, and reinforcing strips secured on the uper edges of the partitions to project at each side thereof and secured at their ends to the flanges on the front and rear edges of the trough.

4. A combined feed receptacle and feed trough adapted for mounting as a unit on a support provided with spaced openings through which animals may have access to the receptacle and trough, in combination a receptacle comprising a front wall and a bottom, and end members secured to the ends of the front and bottom and having outwardly projecting top and rear flanges, hanger members secured to the said top and rear flanges of said end walls, pivots for said hangers adapted to be mounted on the support to support the receptacle to swing forwardly and upwardly, a pivot rod on the upper edge of the front wall, a trough of U-section provided with end walls having flanges on their upper edges, reinforcing bars secured to said flanges on said trough and walls, forwardly projecting hinge members secured to said trough and swingably engaging said pivot rod, said trough being swingable on its hinges to a depending position at the front of the receptacle and swingable therewith or to erected position within the receptacle, and longitudinally spaced partitions for said trough having portions projecting above the trough and constituting guards preventing animals reaching into a trough adjacent the one in front of an opening in the support.

CARL O. JORENBY.

References Cited in the file of this patent

UNITED STATES PATENTS

| Number | Name | Date |
|---|---|---|
| 173,033 | McIntosh | Feb. 1, 1876 |
| 476,265 | Hall | June 7, 1892 |
| 679,285 | Allen | July 20, 1901 |
| 784,940 | Harris | Mar. 14, 1905 |
| 1,095,148 | Ferris | Apr. 28, 1914 |
| 1,124,058 | Neller | Jan. 5, 1915 |
| 1,473,266 | Webb | Nov. 6, 1923 |
| 1,512,987 | Jorenby | Oct. 28, 1924 |
| 1,531,617 | Jahde | Mar. 31, 1925 |
| 1,843,459 | Neihage | Feb. 2, 1932 |
| 1,881,065 | Shirley | Oct. 4, 1932 |
| 2,135,867 | Clark | Nov. 8, 1938 |
| 2,498,981 | Darby | Feb. 28, 1950 |
| 2,574,174 | Dyrdahl | Nov. 6, 1951 |